United States Patent
Pearson

[11] 3,800,497
[45] Apr. 2, 1974

[54] METHOD OF WRAPPING A CONFECTIONARY

[75] Inventor: Daniel Pearson, Culver City, Calif.

[73] Assignee: W. R. Grace & Co., New York, N.Y.

[22] Filed: Oct. 4, 1972

[21] Appl. No.: 294,826

Related U.S. Application Data

[62] Division of Ser. No. 164,868, July 26, 1971, abandoned.

[52] U.S. Cl. .................. 53/14, 53/32, 229/87 F, 426/383, 426/410, 59/2 C
[51] Int. Cl. .................. B65d 65/12, B65b 11/16
[58] Field of Search .......... 99/180 R, 180 A, 171 R, 99/171 CG, 171 LP, 138; 53/32, 227, 131, 14; 229/87 F, 87 R; 426/410, 414, 415, 106, 108, 383; 59/2 C

[56] References Cited
UNITED STATES PATENTS

| | | | |
|---|---|---|---|
| 2,224,017 | 12/1940 | Gurwick | 99/171 P UX |
| 2,082,671 | 6/1937 | Walker | 229/87 F X |
| 3,291,377 | 12/1966 | Eggen | 99/171 R UX |
| 2,744,370 | 5/1956 | Seragnoli | 53/227 X |
| 1,640,052 | 8/1927 | Olsen, Jr. | 99/180 R |
| 3,352,085 | 11/1967 | Pantenburg | 53/32 |
| 2,667,020 | 1/1954 | Broeknuysen et al. | 53/32 |
| 2,299,511 | 10/1942 | Steiner | 99/180 R UX |
| 1,950,539 | 3/1934 | Brownfield | 99/180 R UX |
| 3,096,014 | 7/1963 | Swan | 229/87 B |

FOREIGN PATENTS OR APPLICATIONS

519,960   4/1940   Great Britain ................... 99/171

OTHER PUBLICATIONS

Modern Packaging Encyclopedia 1965, p. 169.

*Primary Examiner*—Frank W. Lutter
*Assistant Examiner*—Steven L. Weinstein
*Attorney, Agent, or Firm*—Eugene M. Bond

[57] ABSTRACT

A method of wrapping a confectionary wherein the confectionary wrapping is generally transparent but includes visually contrasting portions disposed relative to the transparent areas such that upon being wrapped about a circular article, the visually contrasting portions appear as variegated arcuate bands about the circular edge of the article.

4 Claims, 5 Drawing Figures

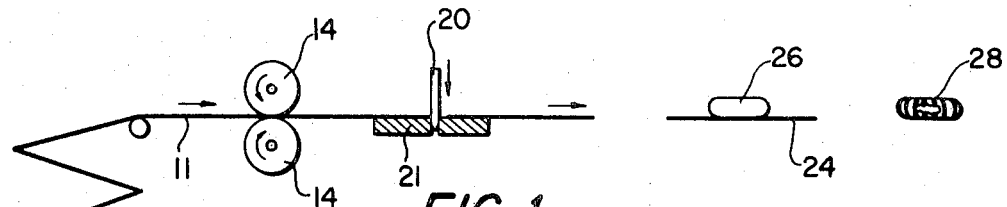
FIG. 1
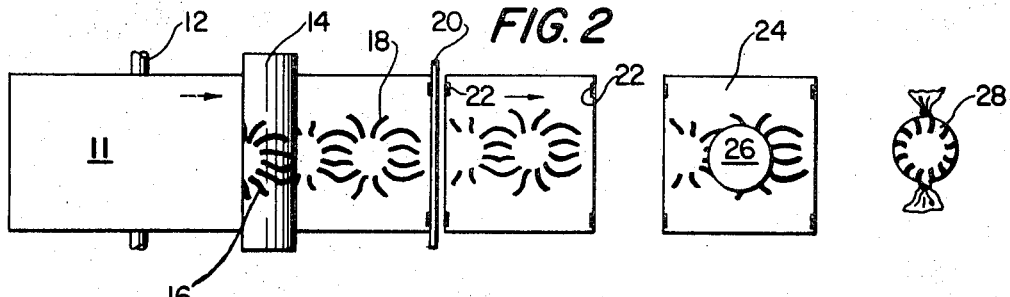
FIG. 2
FIG. 3
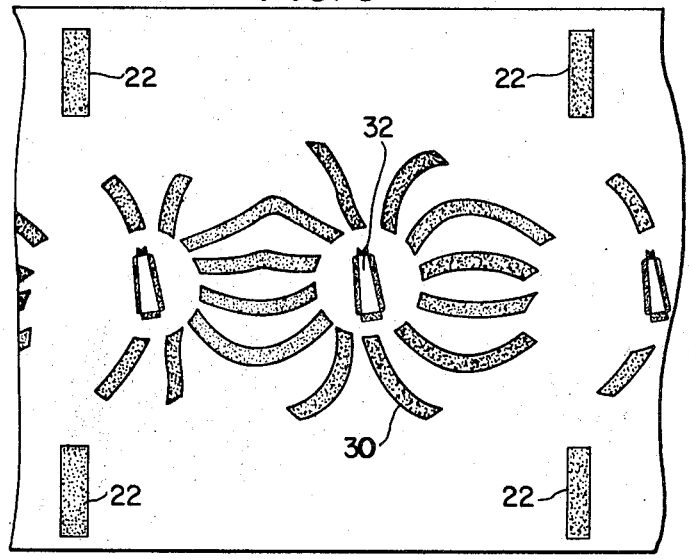

METHOD OF WRAPPING A CONFECTIONARY

This application for U.S. letters Pat. is a divisional of application Ser. No. 164,868, filed July 26, 1971, now abandoned.

This invention relates to a new confectionary wrapping for circular confectionary articles, and to a method of preparing such wrapped articles. More particularly, the present invention provides a new confectionary wrapping which is generally transparent and which includes visually contrasting portions disposed relative to the transparent areas such that upon being wrapped about a circular article, the visually contrasting portions appear as variegated arcuate bands about the circular edge of the article.

Numerous attempts have been made in the prior art to develop wrappings for articles of confectionary such that the articles will present a pleasing appearance to the consumer. Often, the articles include configurations directly on the article's surface which are visual when wrapped with a transparent wrapping. One difficulty of including configurations directly on the article itself, however, is that the configurations often distort during manufacture of the article and thus are not especially pleasing when wrapped. It has now been found that by practice of the present invention there is provided a new wrapping for circular confectionary articles which overcomes many of the difficulties encountered by prior art attempts to provide a pleasing appearance to a wrapped confectionary.

Generally stated, the present invention provides a new confectionary wrapping which is generally transparent and which includes visually contrasting portions disposed relative to the transparent areas such that upon being wrapped about a circular article, the visually contrasting portions appear as variegated arcuate bands generally paralleling each other about the circular edge of the article.

The method of the present invention generally provides, receiving a continuous strip of wrapping material having, if desired, sufficient transparency for viewing of one article therethrough, impressing upon the wrapping visually contrasting bands, severing sections of the impressed wrapping and thereafter, wrapping an article of confectionary such that the visually contrasting bands appear as variegated arcuate bands disposed about the circular edge of the article. The present invention also provides circular articles of confectionary in combination with the present new wrapping.

Practice of the present invention will become more apparent from the following detailed description taken in connection with the accompanying drawings wherein like numerals refer to similar elements throughout the several views.

FIG. 1 generally illustrates the method of the present invention taken as a side diagrammatical view;

FIG. 2 further illustrates the method of FIG. 1 taken as a top elevational view;

FIG. 3 illustrates a portion of the present new wrapping taken as a top elevational view;

Figure 4:
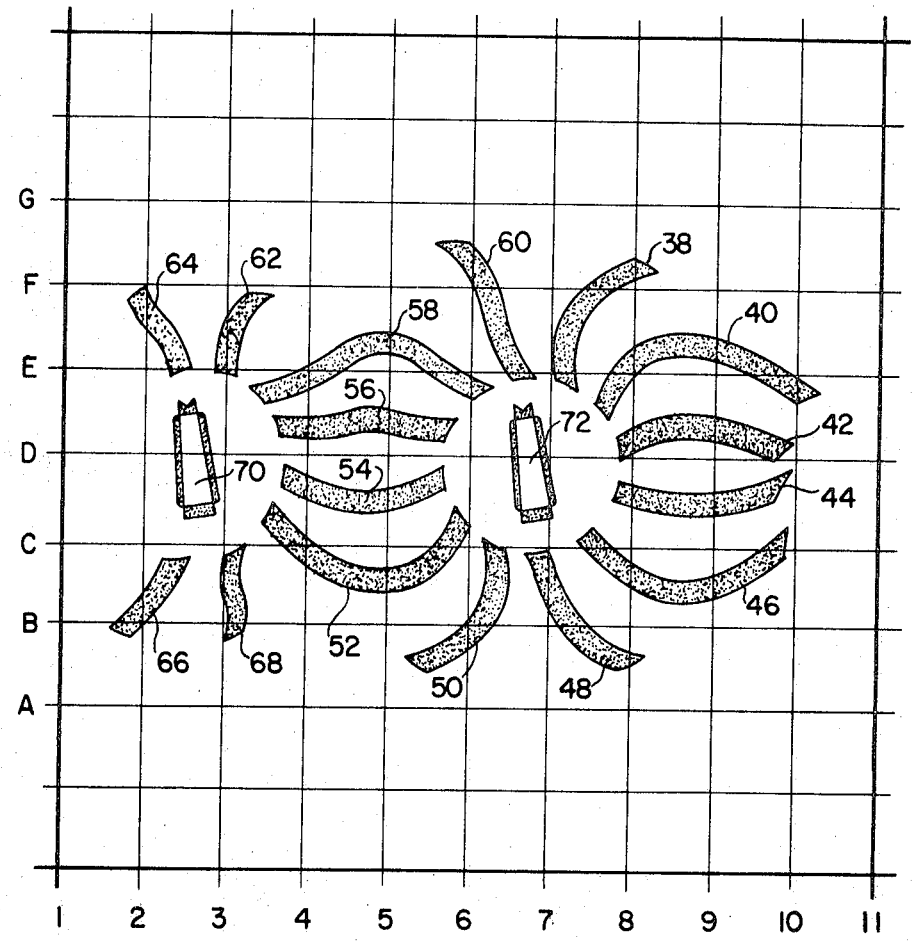
FIG. 4 illustrates the wrapping of FIG. 3 in greater detail within reference lines for identification of relative location of variegated bands.

Referring to the drawings, FIGS. 1 and 2 illustrate the method of the present invention wherein supply 10 of transparent wrapping material is received within impression rolls 14 or other related impression means as desired having particularly configurated bands 16 thereon. After passing through the impression means, there appears visually contrasting portions 18 on the generally transparent wrapping 11.

The continuous strip of wrapping material is received within severing means illustrated generally as blade 20 and anvil 21 for severing sections of wrapping along a location symbol 22. Next, circular confectionary 26 is positioned relative to the severed section of wrapping 24 and wrapping is effected according to conventional techniques using conventional wrapping machinery as desired, with wrapped circular confectionary 28 resulting therefrom.

FIG. 3 illustrates the wrapping as it may appear from the impression means. Location symbol 22 provides a marking zone for severing purposes, a series of particularly configurated bands 30, subsequently described in greater detail provide visually contrasting portions relative to the transparent wrapping, and logo marking 32 or the like provides an area for designation of the article or identification of the supplyer.

The present particularly configurated wrapping for circular articles of confectionary is illustrated in detail in FIG. 4 wherein variegated arcuate bands are positioned relative to graph location lines A to G along a vertical axis, and positioned relative to graph location lines 1 to 11 along a horizontal axis.

Disposed relative to lines 7 and 8 is bowed from line 7 band 38, with more arcuately disposed band 40 being generated from a vertical position through a horizontal location line E. Band 42 is slightly upwardly bowed from line D between location lines 8 and 10. Corresponding to band 42 is slightly downwardly bowed band 44 disposed in relative horizontal position. Relative to band 44 is accentuated downwardly bowed band 46 from line C between locations 7 and 10. Disposed in a vertical position is band 48 slightly arcuate from line 8 to line 7 between location lines A and C. Oppositely bowed relative to band 48 is band 50, also disposed in a substantially vertical position. Relative to line C between location lines 3 and 6 is band 52 downwardly bowed. Downwardly bowed band 54 is illustrated along a line substantially similar to band 44. Slightly central bowed line 54 is illustrated in a substantially horizontal position and relative thereto is upwardly bowed band 58. Vertical band 60 depicts a backward and slightly shaped "s" configuration. From FIG. 4 it will be seen that bands 38 through 60 by the inner terminal edge form a circular configuration wherein may be positioned an identification marking 72, if desired. The opposite ends of bands 52–58 terminate as a partial circular configuration when taken in conjunction with bands 62–68 about identification marking 70, if desired. Band 62 projects vertically along line 3 and slightly bows to line 4 within line F. Relative to band 62 is band 64 which may be described as a slightly shaped "s," vertically disposed band. Oppositely disposed to bands 62 and 64 are lower bands 66 slightly bowed in a vertical direction from location B-2, and band 68 which forms a slightly shaped "s" configuration along line 3. These bands illustrated in FIG. 4 when wrapped about a circular article present a variegated configuration as illustrated in FIG. 5.

Figure 5:
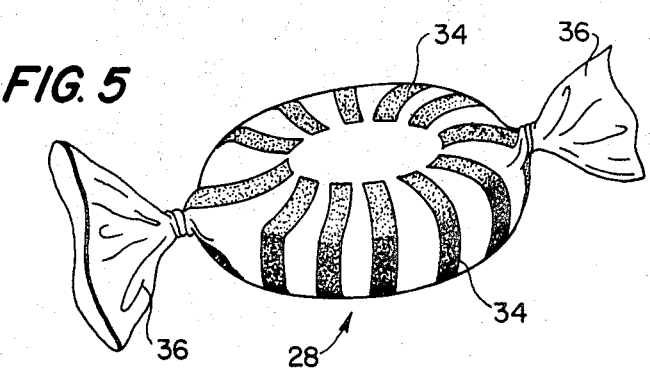
FIG. 5 illustrates a circular confectionary article in combination with the present wrapping with variegated arcuate bands disposed about the circular edge of the article.

FIG. 5 illustrates wrapped circular confectionary 28 having a transparent wrapping with visually contrasting portions 34 appearing as variegated arcuate bands generally paralleling each other as stripes about the circular edge of the article. The wrapping is illustrated maintained in position about the confectionary article by twisted ends 36 which are twisted in opposite directions.

The visual contrast may be effected by numerous means. The wrapping, although desirably transparent generally, may be transparent in the areas of the contrasting bands, or the areas may be transparent relatively to each other. Because transparency is desired so that a consumer may view the article of confectionary encased therein, it is preferred for use as the wrapping material. It is recognized that nontransparent wrapping may also be used where view of the wrapped article is not desired.

It is recognized that although the articles of confectionary processed by the present invention typically include comestibles such as candy and chewing gum in individual wrappers as separate, discrete articles, if desired, most any article may be wrapped using the present wrapping and method. Accordingly, although a preferred embodiment of the invention has been illustrated herein, it is to be understood that various changes and modifications may be made in the construction and arrangement of elements without departing from the spirit and scope of the invention as defined.

I claim:

1. A method for preparing a wrapped circular confectionery article which comprises receiving a continuous strip of wrapping material, impressing upon the wrapping visually contrasting bands particularly configurated and defined by graph FIG. 4, coordinates A-G and 1-11, severing sections of the impressed wrapping such that each section includes the configuration of FIG. 4, placing and wrapping a circular confectionery article in the severed section of wrapping material such that the wrapped article has visually contrasting bands disposed as variegated arcuate bands about the circular edge of the article.

2. The method of claim 1 wherein wrapping is effected by twisting two edges of the severed wrapping in opposite directions.

3. The method of claim 1 wherein the wrapping material is generally transparent, and wherein the bands are contrastingly less transparent.

4. The method of claim 1 wherein severing is effected at a severing location symbol disposed at locations along the continuous strip of wrapping material.

* * * * *